United States Patent [19]

Corti

[11] Patent Number: 4,941,419

[45] Date of Patent: Jul. 17, 1990

[54] CATAMARAN BOAT STRUCTURE

[76] Inventor: Dario Corti, Corso Venezia, 12, 20122 Milano, Italy

[21] Appl. No.: 342,754

[22] Filed: Apr. 25, 1989

[30] Foreign Application Priority Data

Apr. 29, 1988 [IT] Italy ................ 20370 A/88

[51] Int. Cl.⁵ .............................................. B63B 1/00
[52] U.S. Cl. ...................................... 114/61; 114/345; 114/344
[58] Field of Search ................. 114/345, 353, 61, 56, 114/288, 289, 344; 441/40

[56] References Cited

U.S. PATENT DOCUMENTS

| | | | |
|---|---|---|---|
| 2,794,192 | 6/1957 | Paris | 114/345 |
| 3,694,836 | 10/1972 | Serra | 114/345 |
| 4,231,131 | 11/1980 | Young | 114/345 |

FOREIGN PATENT DOCUMENTS 3527370  2/1987  Fed. Rep. of Germany ...... 114/345

Primary Examiner—Sherman D. Basinger
Assistant Examiner—Jesûs D. Sotelo
Attorney, Agent, or Firm—Bucknam and Archer

[57] ABSTRACT

There is disclosed a catamaran either of the inboard or of the outboard type comprising a tunnel having a decreasing height from the bow to the stern thereof and so shaped as to provide an optimal distribution of the underlaying air pressure and in which, under the two flexible material tubular elements supporting the overlaying structure there are affixed tight rigid hulls which can consist of two or more parts in order to better fit the configurations of the waves by exploiting the resiliency of the tubular elements. The rear part of each hull is so designed as to form a small tunnel for preventing water from laterally exiting which is very important at the start and gliding of the boat. Thus the boat will be very soft, safe with high speed and reduced consume characteristics.

7 Claims, 1 Drawing Sheet

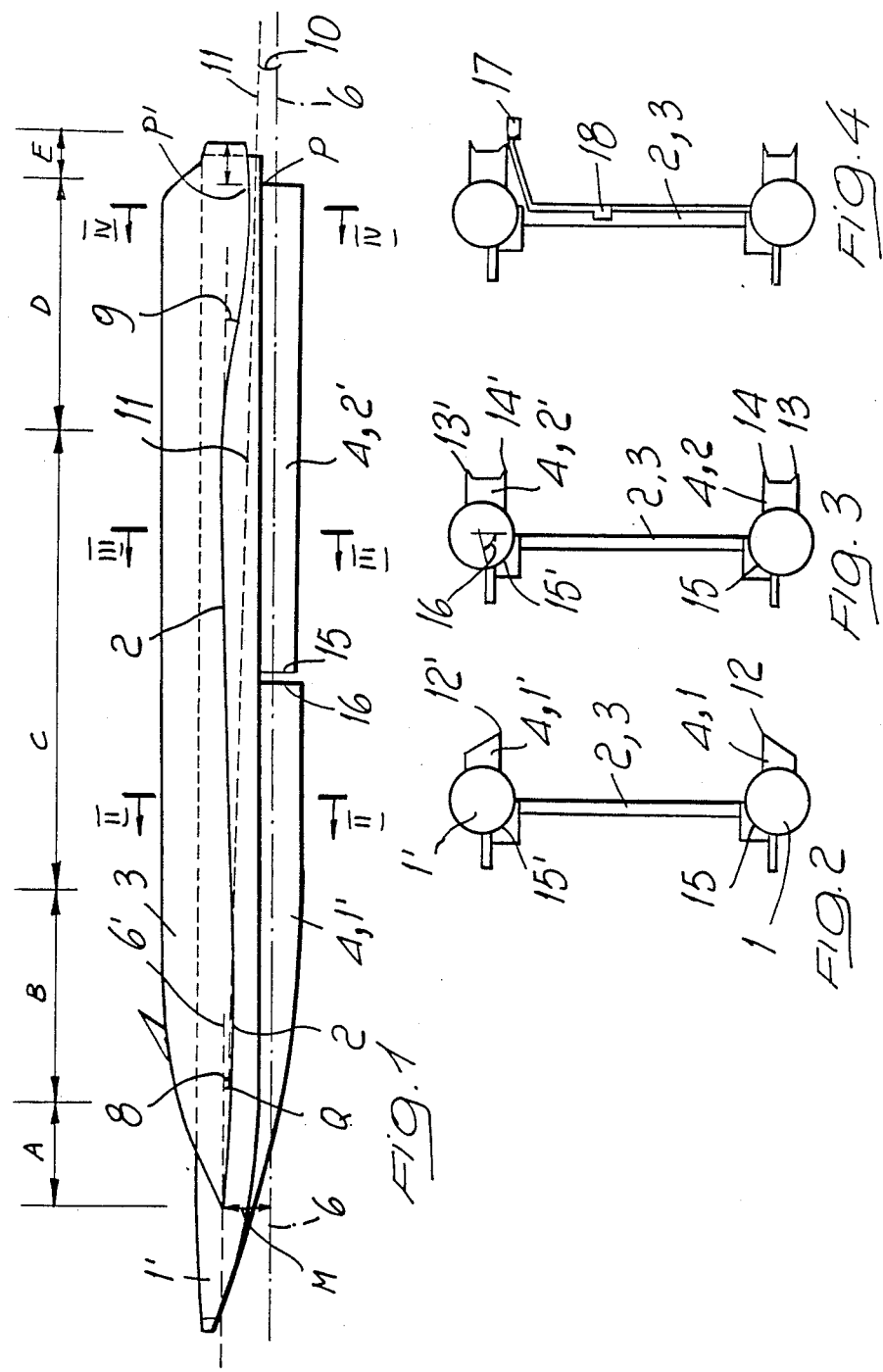

CATAMARAN BOAT STRUCTURE

BACKGROUND OF THE INVENTION

The present invention relates to a boat structure, either of the inboard or outboard engine type, of catamaran design.

As is known, such a boat has very high speed characteristics, but it is very difficult to drive.

On the other hand these boats should be very safe in operation.

A frequent drawback affecting catamarans is that mount up under the wave force and are rearwardly tilted because of air pressure on the broad surface of the tunnel as the bow is raised. Because of this drawback catamarans are usually constructed to lay horizontally as far as possible. However this attitude is such as to greatly reduce sailing comfort and performance since the catamaran hulls will impinge on the waves without any angles. Another negative consequence is a speed loss due to the great impacts of the boat against the waves, with a great increasing of the fuel consume.

SUMMARY OF THE INVENTION

Accordingly, the main object of the present invention is to overcome the above mentioned drawbacks, by providing an engine catamaran which is very safe in operation even if it is driven by a unskilled person, which can be easily manoeuvred under all of the sea conditions and which, moreover, has very high speed and reduced consume capabilities.

This object, as well as yet other objects, which will become more apparent hereinafter, are achieved, according to one aspect of the present invention, by a catamaran boat having the features of the characterizing portion of claim 1.

Further advantageous improvements of the invention are defined in the subclaims.

Thus, owing to the fact that the tunnel formed between the deck forming the bottom of the dead structure of the boat and the surface of the water is laterally completed by the hulls coupled to the tubular elements and that the deck is so arranged that the tunnel, having a gradually variable height from bow to stern, assumes a minimum height at the rear ends of the hulls, at these rear end portions there are formed regions of maximum compression of the air conveyed to the tunnel, with a consequent autoadjusting effect which causes the longitudinal stability of the boat to greatly increase thereby preventing the boat from mounting up.

This effect is further improved by the fact that the rear end of each hull is spaced from the rear end of the boat by a portion which has a length corresponding to about 5% of the overall boat length, since this permits the air exiting the tunnel to gradually expand, with a similar effect to that of a Venturi tube, with a consequent great reduction of the turbulence.

Moreover, because of the particular shape of the deck and hulls, as claimed in the subclaims, and since the hulls are subdivided into several portions each of which is independently coupled to the tubular elements, the tunnel stabilizing effects are further improved and the resiliency of the tubular elements is efficiently exploited for a better fitting to the shape of the waves.

BRIEF DESCRIPTION OF THE DRAWINGS

The invention will become more apparent hereinafter from the following detailed description of a preferred exemplary embodiment thereof, with reference to the accompanying drawing, in which:

FIG. 1 is a schematic longitudinal cross-section view of a catamaran engine boat according to the present invention;

FIGS. 2, 3 and 4 are schematic detail cross-sectional views of the catamaran according to the invention, taken along the section lines II—II, III—III and IV—IV respectively of FIG. 1 and showing main portions of the boat.

DESCRIPTION OF THE PREFERRED EMBODIMENT

With reference to FIG. 1, the tunnel of the boat is delimited: at the top by the deck 2 forming the bottom of the boat dead structure 3; laterally by the pneumatic side tubular elements 1,1' (of which only the element 1' is shown in the figure) and by the underlaying hulls or boots 4.1,4.2 and 4.1', 4.2' (of which only the elements 4.1' and 4.2' are shown) which are coupled to the tubular elements; and at the bottom by the surface of the water, indicated by the floating line 6.

The deck 2 is slanted with respect to the floating line 6, so that the height of the tunnel preferably varies as indicated hereinbelow, to have a minimum value at the rear end P of each hull. This minimum height point is arranged at the level of the rear ends of the hulls (as shown in FIG. 1)±5% of the total length of the boat. The longitudinal shape of the bottom of the dead structure comprises, starting from the boat bow, a first portion A forming an angle with respect to the floating line 6 which varies from 0° to 5°, for an indicative length equal to 10–15% of the overall length of the boat; this slanted portion meeting then with a central region with an angle of zero (at B) and then a negative angle (at C) from 0° to 25° and then again with a positive angle (at D) of 5°–45° to arrive at the lowermost point P' of the dead structure, therefrom this angle becomes negative again at the terminal portion (0°–5°).

In this connection it has been found that an optimum angle 10 between the line 11 connecting the lowermost point P' of the deck 3 to the end point Q of the first portion A and the floating line 6 is from 1° to 6°, the preferred value being of 3°.

This is clearly shown in the exemplary figure 1 of the drawing.

The effects of the tunnel are improved by the shown shape and arrangement of the hulls applied to the bottom regions of the tubular elements which resiliently connect said hulls to the boat dead structure.

More specifically these hulls are preferably made of two or more separated portions 4.1,4.2 and 4.1',4.2' so as to exploit the resiliency of the tubular elements 1,1' to fit the shape of the waves. In this connection it should be apparent that the hull-tubular element combination forms tight compartments to improve the floating characteristics of the inventive boat.

As shown, the front portions 4.1,4.1' of the hulls have a deep V shaped groove (indicated at 12 in FIG. 2) which is flattened toward the stern of the boat. The rear portion 4.2,4.2' is provided with two substantially triangular ridges on the two sides thereof, as specifically shown in FIGS. 3 and 4.

In particular the inner ridge 14, of greater extension than the other ridge, is provided for preventing water from exiting and for providing the boat with driving stability, the outer ridge 13 being mainly provided for preventing water from exiting. The rear portions 4.2,4.2' of the hulls form a step with the front portions (between 16 and 15 in FIG. 1) and have an impinging angle with the horizontal plane of 1°-4° in order to facilitate the gliding of the boat, which is very important at the start of the sailing.

The boat "dead" structure is coupled to the tubular elements by glueing a suitably shaped portion of the dead structure covering a tubular segment from 25° to 60°, and preferably corresponding to 45° (FIG. 3) which value has been found to be a very satisfactory tradeoff between the necessary mechanical strength of the coupling and a suitable resiliency of the structure.

In order to improve the boat shipping or transport characteristics there are provided two or more withdrawing wheels which are mounted on the bottom of the dead structure and enclosed, during sailing, in suitable compartments formed in said dead structure, as shown in FIG. 4 which, by simplicity, shows a single wheel 17 and a single compartment 18.

Advantageously, the deck 2 and hulls 4,4' are made of vinylester resins reinforced with polyaramide fibres and are glued to tubular elements 1,1' made of a rubberized cloth. This construction provided a low weight structurally simple high mechanical resistance boat.

While the catamaran boat has been disclosed and illustrated with reference to a preferred embodiment thereof, it should be apparent that the disclosed embodiment is susceptible to several modifications and variations all of which will come within the spirit and scope of the invention.

For example, while the hull construction of the invention has been shown and illustrated applied to an engine inboard or autboard boat, this construction can be also applied to a sailboat, or as a construction for water supporting seaplanes and the like.

I claim:

1. A motorboat of the cataraman type comprising two tubular elements of substantially cylindrical shape, tapering at respective end portions thereof, made of an elastomeric material and arranged with a parallel and symmetrical relationship with respect to a longitudinal axis of the motorboat and coupled and spaced by a deck forming a bottom of a top dead structure, at a bottom portion of each tubular element there being coupled a rigid elongated hull extending substantially along said tubular element and consisting of at least a portion of a hollow section member having a closed loop cross section, the deck delimiting a top portion of a tunnel formed by the motorboat with the surface of the water being longitudinally shaped so that the height of the tunnel, having a gradually varying height from the boat bow to the boat stern, assumes a minimum value at the rear ends of the hulls, wherein said deck comprises, starting from the motorboat bow, a first positive slope portion which forms with a parallel line to the floating line passing through the front end of the deck an angle from about 0° to 5° for a length equal to about 10 to 15% of the overall length of said motorboat, meeting with a central region with a first portion of substantially zero slope followed by a portion having a slope from 0° to −5°, and a penultimate portion of greater positive slope from about 5° to 45° to arrive at the lowermost point of the deck bottom therefrom the slope becomes negative again, from 0° to 5°, at the terminal end portion, an optimum angle between the line coupling the lowermost point of the deck to the end point of the first portion and the floating line varying from 1° to 6°.

2. A motorboat according to claim 1, wherein said at least a hollow section member portion comprises at least two separated portions each coupled to the bottom portion of the respective tubular element.

3. A motorboat according to claim 1, wherein the cross-section of each hull has a front substantially trapezoidal shape with an acute angle facing downward and toward the inside of the tunnel which, toward the stern, tends to become a right angle and, at the rear portion, is provided with two substantially triangular side, inner and outer ridges, the inner ridge having a greater extension that that of the outer ridge.

4. A motorboat according to claim 3, wherein the height of the cross-sections of the portions of the hulls of each tubular element is reduced, at the top end of each said portion, with respect to the height of the rear cross-section of a preceding portion, adjoining therewith, and slightly increases toward the boat stern with an angle between the bottom surface of the hull and the floating line varying between about 1° and 4°.

5. A motorboat according to claim 1, wherein the deck and hulls are made of a vinylester resin reinforced by polyaramide reinforcing fibres and are coupled to tubular elements made of rubberized cloth.

6. A motorboat according to claim 5, wherein the deck is coupled to the tubular elements by glueing a part of longitudinal edges of the deck which is so designed as to cover a portion of the tubular elements extended to an angle from about 25° to 60°.

7. A motorboat according to claim 1, wherein said motorboat comprises at least a pair of withdrawing wheels which are mounted on the bottom of the dead structure and can be enclosed, during the sailing, in compartments formed in said dead structure.

* * * * *